May 21, 1946.  G. A. NESTY ET AL  2,400,774
PROCESS FOR THE PRODUCTION OF STYRENE AND BUTADIENE
Filed Nov. 4, 1943
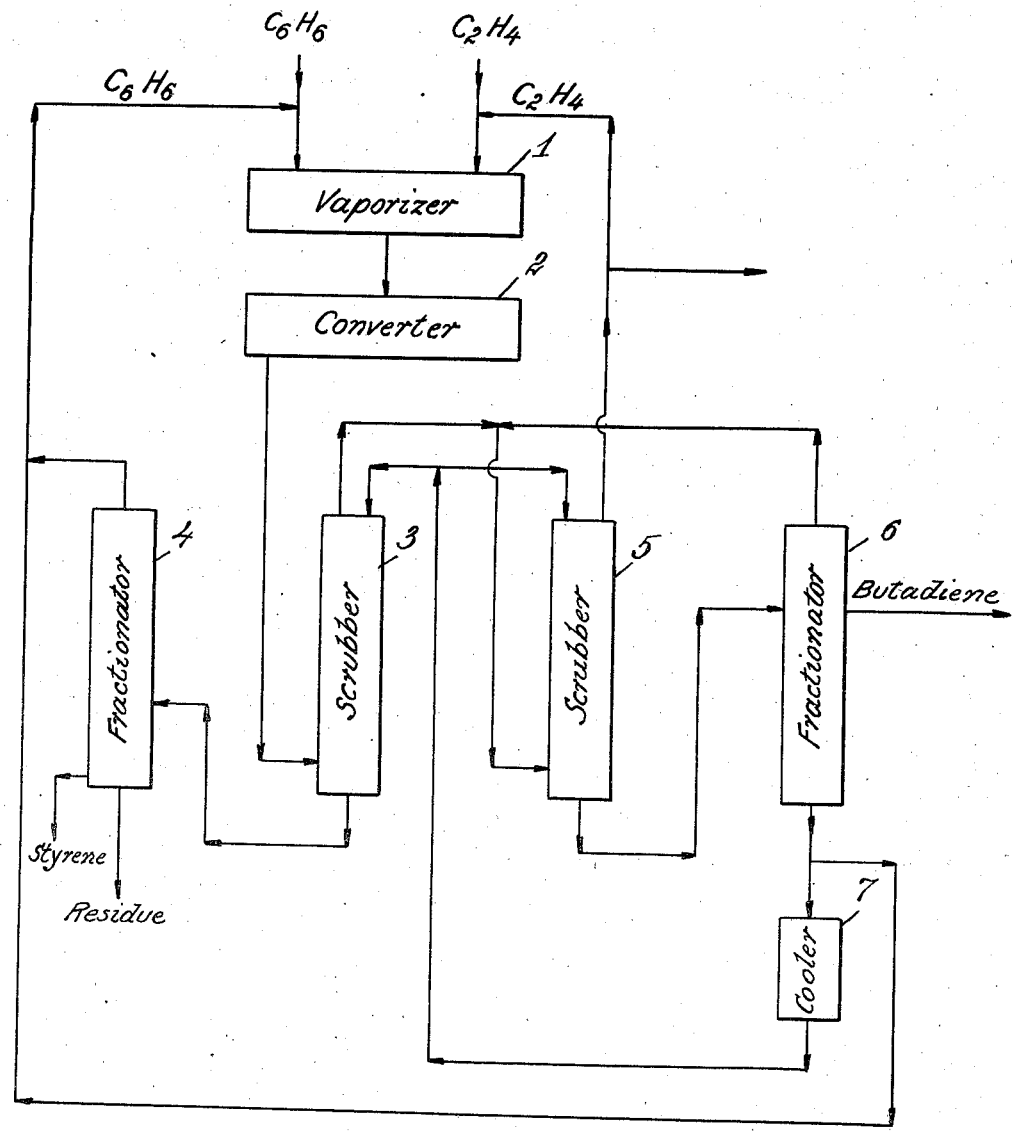
INVENTOR.
Glenn Albert Nesty
William C. Klingelhoefer
BY Robert B Clark
ATTORNEY Patented May 21, 1946

2,400,774

UNITED STATES PATENT OFFICE 2,400,774

PROCESS FOR THE PRODUCTION OF STYRENE AND BUTADIENE

Glenn Albert Nesty, Syracuse, and William Christian Klingelhoefer, Baldwinsville, N. Y., assignors to The Solvay Process Company, New York, N. Y., a corporation of New York Application November 4, 1943, Serial No. 508,922

4 Claims. (Cl. 260—669)

This invention relates to the production of styrene.

As is well known, styrene has been employed for many years in the manufacture of polystyrene resins which have found extensive use in the plastics field; in addition, styrene is now widely used in the manufacture of synthetic rubber. As a result, this material is in great demand.

Styrene is at present obtained from a variety of sources. It may be manufactured synthetically by reacting benzene with ethylene to form ethylbenzene and then dehydrogenating the ethylbenzene to produce styrene; while this process has been extensively employed, it has the disadvantages that two separate steps are involved. Styrene may also be obtained in the fractionation of coal tar or from products formed during the cracking or reforming of petroleum distillates; however, neither of these sources is at present capable of supplying sufficient styrene of satisfactory purity to meet the present demand therefor.

It is an object of this invention to provide a new process for the production of styrene from benzene and ethylene.

It is a more particular object of this invention to provide a one-step process whereby benzene and ethylene are reacted to form styrene, as well as appreciable quantities of butadiene.

We have found that by carrying out the reaction of benzene and ethylene under carefully controlled conditions as hereinafter specified so as to avoid undue attack on the reactants, styrene may be directly produced in one step in commercially valuable quantities and, in addition, that appreciable amounts of butadiene may also be recovered from the reaction mixture. The process by which such advantageous results may be achieved involves reacting benzene and ethylene in the gaseous phase at a temperature between about 775° and about 850° C., and at a space velocity from about 75 to about 700 reciprocal hours, the mol ratio of ethylene to benzene introduced into the reactor being such that an excess of ethylene is present preferably, such that the mol ratio of ethylene to benzene is between about 1.3 and about 2.3.

The process of our invention may be most advantageously carried out by passing a mixture of ethylene and benzene, the mol ratio of ethylene to benzene being between about 1.3 and about 2.3, at atmospheric pressure through a heated tube packed with crushed firebrick, and maintained at a temperature between 775° and 850° C. at a space velocity between about 75 and about 700 reciprocal hours. In carrying out the reaction under the controlled conditions above specified, not more than about 12% by volume of the benzene is attacked, of which between about 60% and about 75% by volume is converted to styrene; under these conditions not more than about 20% by volume of the ethylene introduced is attacked, of which between about 15% and about 30% by volume is converted to styrene and between about 25% and about 40% by volume to butadiene. After recovery of the styrene and butadiene products from the reaction mixture, the residual gas containing hydrogen and unreacted ethylene and the unreacted benzene may be returned to the reactor for the production of further quantities of styrene and butadiene.

From the above description it will appear our invention not only provides a method by which benzene and ethylene may be reacted to produce styrene in one step in commercially valuable quantities, but also permits simultaneous production of butadiene. In view of the fact an important type of synthetic rubber is manufactured from the primary reaction products of our invention, i. e., butadiene and styrene, the process of our invention, whereby simultaneous production of these ingredients is effected, is of obvious value.

The space velocity values given in the specification and claims are expressed, as is customary, in terms of the volume of vapors reduced to standard conditions of temperature and pressure passed through the reactor per hour divided by the volume of the reactor.

In carrying out the process of our invention, a mixture of ethylene and benzene in which the mol ratio of ethylene to benzene is between about 1.3 and about 2.3, preferably about 2, is introduced into a reactor which preferably is packed with crushed firebrick which, we have found, reduces the yield of undesirable by-products and thereby enhances the overall efficiency of the reaction. The ethylene employed need not be absolutely pure but may contain as much as 10% by volume of inert gases such as hydrogen. If desired, steam may be incorporated in the mixture as a diluent. The temperature of the reactor should be between about 775° and about 850° C., a temperature of about 825° to 835° C. being preferred. The reacting gases should be passed through the converter at space velocities of the order of 75 to 700, preferably between about 400 and about 650 reciprocal hours. The reaction is preferably carried out at atmospheric pressure since no appreciable advantage is obtained by using super- or sub-atmospheric conditions, which, however, may be employed if desired.

By operating in accordance with the above conditions it will be found that between about 5% and about 10% by volume of the benzene and between about 8% and about 15% by volume of the ethylene is attacked. Of the benzene attacked, between about 60% and about 75% by volume is converted to styrene; of the ethylene attacked, between about 15% and about 30% by volume is converted to styrene and between about 25% and about 40% by volume to butadiene.

The styrene may be recovered from the reaction gases by passing the gases through a scrubber in contact with a suitable styrene solvent. Preferably the gases are scrubbed with benzene at a temperature between 20° and 50° C., the styrene and unreacted benzene being thus absorbed, the styrene then recovered by fractionation and the benzene either employed to react with further quantities of ethylene or returned to the scrubber; benzene contained in the gas leaving the scrubber may also be recovered if desired. The unabsorbed gases, which contain butadiene and unreacted ethylene, may then be scrubbed at a temperature between about 10° and about 30° C. with a further quantity of benzene in order to absorb the butadiene; the butadiene may be recovered by fractionation, and the benzene returned to the scrubber or employed for reaction with further quantities of ethylene. The gases passing through the second scrubber, containing chiefly unreacted ethylene and hydrogen produced during the course of the reaction, may be returned for further reaction with benzene after a portion thereof is bled from the system to prevent undue build-up of the hydrogen concentration.

In addition to styrene and butadiene, appreciable amount of biphenyl are also produced as well as other aromatic compounds such as naphthalene, disubstituted benzenes, substituted biphenyl, acenaphthylene and possibly anthracene. 3- and 4-carbon atom olefins are formed from the ethylene under the conditions above specified, although the amounts of these constituents are not large; these products are usually recovered along with the butadiene and may be separated therefrom as desired. Acetylene is also produced in appreciable quantities together with smaller amounts of methane; these gases pass through the butadiene recovery step along with hydrogen and unreacted ethylene and may be returned with the unreacted ethylene for further reaction with benzene without appreciably affecting the course of the reaction as long as a portion of the gaseous mixture being thus recycled is bled from the system in order to maintain the concentration of the gaseous by-products above mentioned relatively low.

We have surprisingly found that although butadiene is presumably produced directly from ethylene without benzene entering into the reaction, the presence of benzene in the reaction mixture enhances production of butadiene from ethylene under the above conditions, since the yields of butadiene obtained are greater than are obtained by passing pure ethylene through the converter under the same conditions.

A specific embodiment of our invention is illustrated diagrammatically in Figure 1. As shown in Figure 1 benzene and ethylene together with an ethylene-hydrogen mixture recovered from the process as hereinafter described, are mixed in vaporizer 1 in proportions such that a vapor mixture having a mol ratio of ethylene to benzene of about 2 is produced. This gaseous mixture is then passed to converter 2, which may appropriately be a reactor lined and packed with firebrick, maintained at a temperature in the neighborhood of 825° to 835° C., the gaseous mixture flowing through converter 2 at a space velocity between about 400 and about 650 reciprocal hours.

The reaction mixture withdrawn from converter 2 is passed to scrubber 3 wherein the gaseous mixture is scrubbed with benzene at a temperature of between about 20° and about 50° C., the styrene and unreacted benzene being thereby absorbed. The solution of styrene in benzene withdrawn from scrubber 3 is passed to fractionator 4 operated at a reduced pressure of approximately 0.2 atmosphere wherein the benzene is removed by distillation and return to vaporizer 1. A styrene fraction of 95% purity is then recovered from the still. The residue in the still containing biphenyl, naphthalene, anthracene oil, tar and carbon is discarded or fractionated for recovery of biphenyl and naphthalene.

The unabsorbed gases from scrubber 3, containing butadiene and unreacted ethylene, are passed to scrubber 5 wherein they are scrubbed with a benzene solution maintained at a temperature between about 10° and about 30° C., the butadiene being thus absorbed; the solution of butadiene in benzene removed from scrubber 5 also contains some 4-carbon atom olefins, as well as 2- and 3-carbon atom compounds, formed during the course of the reaction and absorbed in the benzene. This solution is withdrawn from the base of scrubber 5 to fractionator 6 wherein the solution is distilled at a pressure of about 1 to 5 atmospheres, the butadiene being recovered in crude form admixed with some 3- and 4-carbon atom compounds at a point intermediate the length of the fractionating column. The gases removed from the top of fractionator 6 are returned to scrubber 5 to recover any butadiene remaining therein. A portion of the benzene residue from fractionator 6 is passed to cooler 7 and then returned to either scrubber 3 or scrubber 5; the remainder of the benzene from fractionator 6 is returned to vaporizer 1 for further reaction.

The unabsorbed gases withdrawn from scrubber 5 comprise chiefly the unreacted ethylene, although appreciable amounts of hydrogen, acetylene and methane are also present. Approximately 20% by volume of these gases is bled from the system and the ethylene contained in the bleed separated from the other gases for reuse; the remaining 80% of the unabsorbed gases is returned to vaporizer 1 for further reaction with benzene.

The following example is illustrative of our invention:

A gaseous mixture of ethylene and benzene, the mol ratio of ethylene to benzene being 2.04, was passed at a space velocity of 642 reciprocal hours through a silica tube packed with 6-10 mesh crushed firebrick and maintained at a temperature of 825° C.; the volume of the reaction zone in this tube was 11 cubic inches. Analysis of the gases showed that approximately 7.9% by volume of the benzene and 10.8% by volume of the ethylene were attacked. Of the benzene attacked 69.5% by volume was converted to styrene; 25% by volume of the ethylene attacked was converted to styrene and 25.6% by volume was converted to butadiene.

It will be evident from the above description that the process of our invention provides a new and useful method for the production of butadiene and styrene. Further, our process does not required the use of catalysts for its operation.

Since certain changes may be made in carrying out the above process without departing from the scope of the invention, it is intended that all matter contained in the above description shall be interpreted as illustrative and not in a limiting sense.

We claim:

1. A process for the simultaneous production of styrene and butadiene which comprises passing a gaseous mixture of ethylene and benzene, the mol ratio of ethylene to benzene being between about 1.3 and about 2.3, through a reactor maintained at a temperature between about 775° and about 850° C. at a space velocity of between about 75 and about 700 reciprocal hours, whereby not more than about 12% by volume of the benzene and not more than 20% by volume of the ethylene is attacked, and recovering butadiene and styrene from the reaction mixture.

2. A process for the simultaneous production of styrene and butadiene which comprises passing a gaseous mixture of ethylene and benzene, the mol ratio of ethylene to benzene being about 2, through a reactor packed with firebrick and maintained at a temperature of between about 825° and about 835° C. at a space velocity of between about 400 and about 650 reciprocal hours, whereby between about 5% and about 10% by volume of the benzene and between about 8% and about 15% by volume of the ethylene is attacked, and recovering styrene and butadiene from the resulting mixture.

3. A process for the simultaneous production of styrene and butadiene which comprises passing a gaseous mixture of ethylene and benzene, the mol ratio of ethylene to benzene being about 2, through a reactor packed with firebrick and maintained at a temperature between about 825° and about 835° C. at a space velocity of between about 400 and about 650 reciprocal hours, contacting the reaction mixture with benzene at a temperature between about 20° and about 50° C. to remove styrene and unreacted benzene therefrom, recovering styrene from the benzene solution produced, contacting the gases which are not absorbed in the benzene with further quantities of benzene at a temperature between about 10° and about 30° C. to remove butadiene therefrom, recovering butadiene from the solution produced, and returning to the reactor ethylene containing gases which remain unabsorbed.

4. A process for the simultaneous production of styrene and butadiene which involves passing a gaseous mixture of benzene and ethylene, the mol ratio of ethylene to benzene being such that an excess of ethylene is present, through a reactor at a temperature maintained between about 775° and 850° C., at a space velocity between about 75 and 700 reciprocal hours.

GLENN ALBERT NESTY.
WILLIAM CHRISTIAN KLINGELHOEFER.